US010172197B1

(12) United States Patent
Gao et al.

(10) Patent No.: US 10,172,197 B1
(45) Date of Patent: Jan. 1, 2019

(54) DIMMABLE SINGLE-STAGE POWER CONVERTER WITH ADAPTIVE SWITCHING FREQUENCY CONTROL

(71) Applicants: DIALOG SEMICONDUCTOR INC., Campbell, CA (US); DIALOG SEMICONDUCTOR (UK) LIMITED, London (GB)

(72) Inventors: Xiaolin Gao, Campbell, CA (US); Zhiqiu Ye, Beijing (CN); Nailong Wang, Beijing (CN)

(73) Assignees: DIALOG SEMICONDUCTOR, INC., Campbell, CA (US); DIALOG SEMICONDUCTOR (UK) LIMITED, London (GB)

( * ) Notice: Subject to any disclaimer, the term of this patent is extended or adjusted under 35 U.S.C. 154(b) by 0 days.

(21) Appl. No.: 15/713,415

(22) Filed: Sep. 22, 2017

(51) Int. Cl.
H05B 33/08 (2006.01)
(52) U.S. Cl.
CPC ................ H05B 33/0815 (2013.01)
(58) Field of Classification Search
None
See application file for complete search history.

(56) References Cited

U.S. PATENT DOCUMENTS

2012/0176820 A1* 7/2012 Li ................. H02M 3/33507
363/21.12
2014/0354170 A1* 12/2014 Gredler .............. H05B 33/0815
315/224
2016/0212813 A1* 7/2016 Li ..................... H05B 33/0845

OTHER PUBLICATIONS

NXP Semiconductors, "SSL5511T Greenchip controller for LED lighting with DIM pin," Preliminary Data Sheet, May 27, 2014, pp. 1-22, Rev. 1, NXP Semiconductors N.V., Eindhoven, Netherlands.
Infineon Technologies AG, "ICL 8105—Digital Flyback Controller IC," Datasheet, Aug. 1, 2016, pp. 1-32, Rev. 2.0, Infineon Technologies AG, Munich, Germany.

* cited by examiner

Primary Examiner — Jany Richardson
(74) Attorney, Agent, or Firm — Haynes and Boone, LLP

(57) ABSTRACT

Systems, methods, and apparatus for a circuit with adaptive switching frequency control are disclosed. The method comprises operating a controller of the dimmable single-stage power converter in pulse width modulation (PWM) mode at a first switching frequency level from a maximum dimming duty-ratio level until a first dimming duty-ratio level. The method further comprises operating the controller in PWM mode, while reducing switching frequency from the first switching frequency level to a second switching frequency level, from the first dimming duty-ratio level until a second dimming duty-ratio level. Also, the method comprises operating the controller in PWM mode at the second switching frequency level from the second dimming duty-ratio level until a current command ($V_{ipk}$) falls below a predetermined low limit value. Further, the method comprises operating the controller in skip mode, while reducing the switching frequency from the second switching frequency level, until a minimum dimming duty-ratio level.

21 Claims, 10 Drawing Sheets

DIMMABLE SINGLE-STAGE POWER CONVERTER WITH ADAPTIVE SWITCHING FREQUENCY CONTROL

FIELD

The present disclosure relates to single-stage power converters. In particular, it relates to dimmable single-stage power converters with adaptive switching frequency control.

BACKGROUND

Currently, dimmable single-stage power converters do not control the switching frequency as a function of dimming or, alternatively, the dimmable single-stage power converters control the frequency in an adverse way such that deep dimming and dimming accuracy cannot be achieved. In addition, when dimming down dimmable single-stage power converters, audible noise is present.

As such, there is a need for an improved technique for dimmable single-stage power converters that provides deep dimming with good dimming accuracy and mitigates audible noise when dimming down, while maintaining a sufficiently high power factor (PF) and a low total harmonic distortion (THD).

SUMMARY

The present disclosure relates to a method, system, and apparatus for a dimmable single-stage power converter with adaptive switching frequency control. In one or more embodiments, a method (refer to FIG. 8) for a circuit with adaptive switching frequency control comprises operating a controller 150 of a dimmable single-stage power converter (refer to FIG. 1) in pulse width modulation (PWM) mode at a first switching frequency level (e.g., 90 kilohertz (kHz)) from a maximum dimming duty-ratio level (e.g., 100 percent (%)) until a first dimming duty-ratio level (e.g., 85%). The method further comprises operating the controller in PWM mode, while reducing switching frequency from the first switching frequency level (e.g., 90 kHz) to a second switching frequency level (e.g., 25 kHz), from the first dimming duty-ratio level (e.g., 85%) until a second dimming duty-ratio level (e.g., 20%). Also, the method comprises operating the controller in PWM mode at the second switching frequency level (e.g., 25 kHz) from the second dimming duty-ratio level (e.g., 20%) until a current command ($V_{ipk}$) falls below a predetermined low limit value (e.g., 0.25 volts (V)). Further, the method comprises operating the controller in skip mode, while reducing the switching frequency from the second switching frequency level (e.g., 25 kHz), until a minimum dimming duty-ratio level (e.g., 1%) is reached.

In one or more embodiments, the switching frequency is reduced from the first switching frequency level (e.g., 90 kHz) to the second switching frequency level (e.g., 25 kHz) in one of a linear fashion or a non-linear fashion. In at least one embodiment, the switching frequency is reduced from the first switching frequency level (e.g., 90 kHz) to the second switching frequency level (e.g., 25 kHz) in a parabolic fashion. In some embodiments, the second switching frequency level (e.g., 25 kHz) is above an audible noise band to mitigate audible noise.

In at least one embodiment, when the controller is operating at the maximum dimming duty-ratio level (e.g., 100%), the current command ($V_{ipk}$) is at a designed high limit value (e.g., 1.25V). In one or more embodiments, the designed high limit value (e.g., 1.25V) for the current command ($V_{ipk}$) is related to efficiency to avoid unnecessary loss. In some embodiments, the predetermined low limit value (e.g., 25V) for the current command ($V_{ipk}$) is related to an amount of energy stored in a primary winding of a transformer of the single-stage power converter.

In one or more embodiments, the controller operates in skip mode below the second dimming duty-ratio level (e.g., 20%) to avoid an increase in total harmonic distortion (THD) and individual harmonics. In some embodiments, the switching frequency is a frequency that a power switch Q1 of the single-stage power converter is switched at.

In at least one embodiment, the method further comprises receiving, by the controller, pulse width modulation (PWM) pulses indicating a desired level of dimming; and adjusting, by the controller, an output current level for the single-stage power converter according to a duty-ratio of the pulses.

In one or more embodiments, a circuit with adaptive switching frequency control comprises a single-stage power converter. The circuit further comprises a controller within the single-stage power converter (1) to operate in pulse width modulation mode (PWM) at a first switching frequency level (e.g., 90 kHz) from a maximum dimming duty-ratio level (e.g., 100%) until a first dimming duty-ratio level (e.g., 85%); (2) to operate in PWM mode while reducing switching frequency from the first switching frequency level (e.g., 90 kHz) to a second switching frequency level (e.g., 25 kHz), from the first dimming duty-ratio level (e.g., 85%) until a second dimming duty-ratio level (e.g., 20%); (3) to operate in PWM mode at the second switching frequency level (e.g., 25 kHz) from the second dimming duty-ratio level (e.g., 20%) until a current command ($V_{ipk}$) falls below a predetermined low limit value (e.g., 0.25V); and (4) to operate in skip mode, while reducing the switching frequency from the second switching frequency level (e.g., 25 kHz), until a minimum dimming duty-ratio level (e.g., 1%) is reached.

In at least one embodiment, the controller is further configured to receive pulses indicating a desired level of dimming, and to adjust an output current level for the single-stage power converter according to a duty-ratio of the pulses.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIG. 1 a diagram showing an exemplary dimmable single-stage power converter that may be employed for the disclosed dimmable single-stage power converter with adaptive switching frequency control that utilizes the disclosed adaptive switching frequency control scheme, in accordance with at least one embodiment of the present disclosure.

Figure 1:
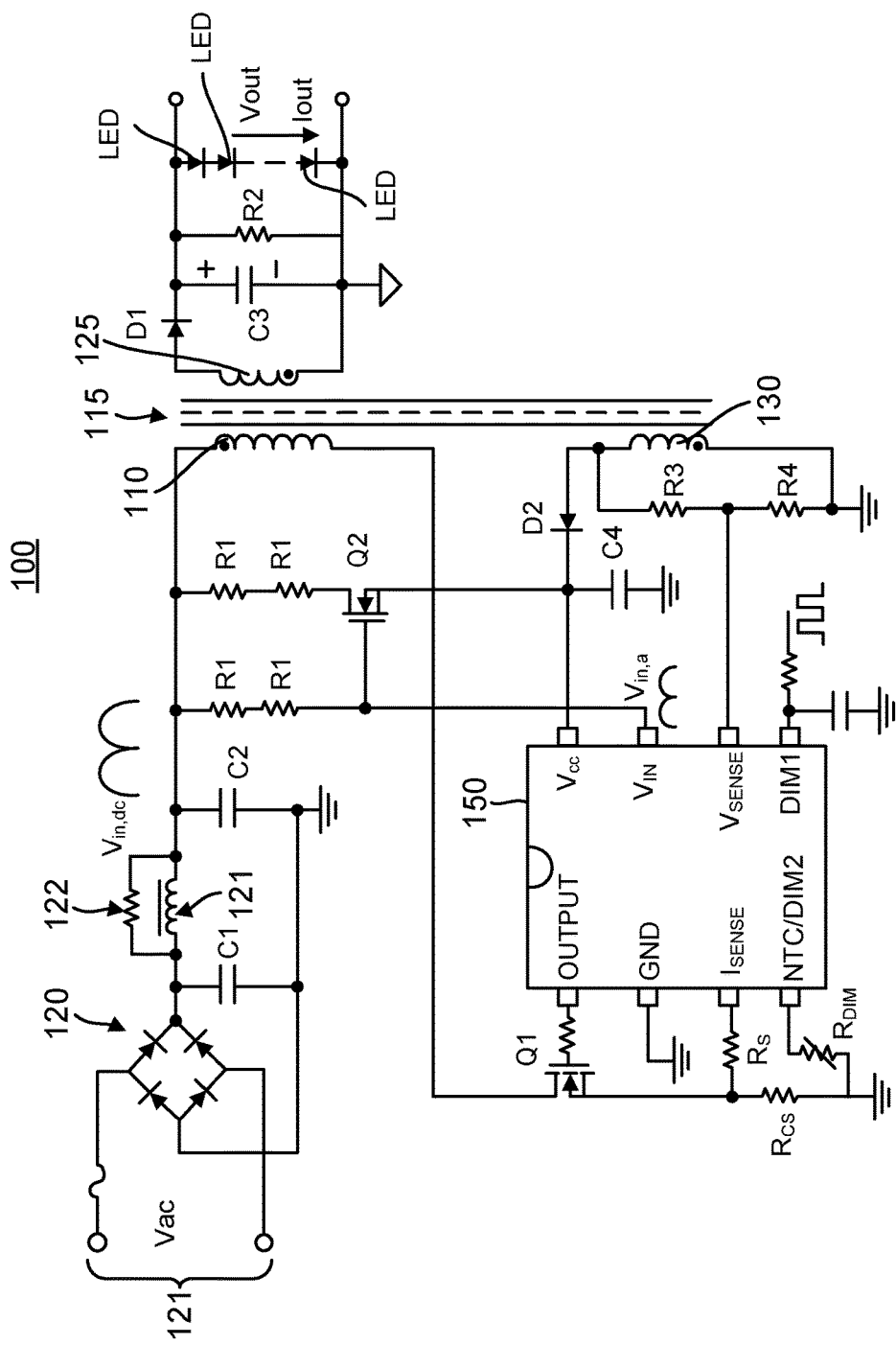
Figure 6:
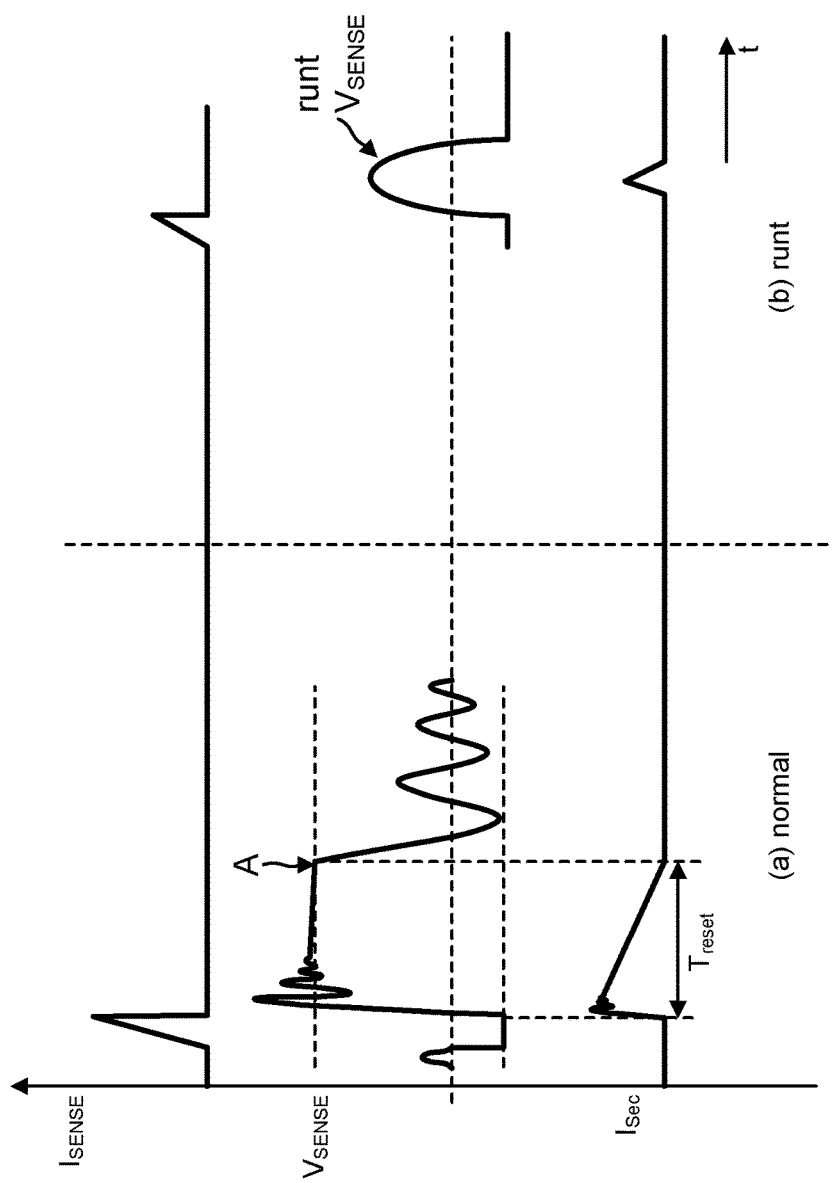

FIG. 6 is a graph showing exemplary normal signals and runt signals for the $I_{SENSE}$ current (i.e. the current sensed on the current sense pin ($I_{SENSE}$ pin) of the controller of FIG. 1), the $V_{SENSE}$ voltage (i.e. the voltage sensed on the voltage sense pin ($V_{SENSE}$ pin) of the controller of FIG. 1), and the secondary diode current ($I_{SEC}$) (i.e. the current through diode D1 of FIG. 1), in accordance with at least one embodiment of the present disclosure.

Figure 7:
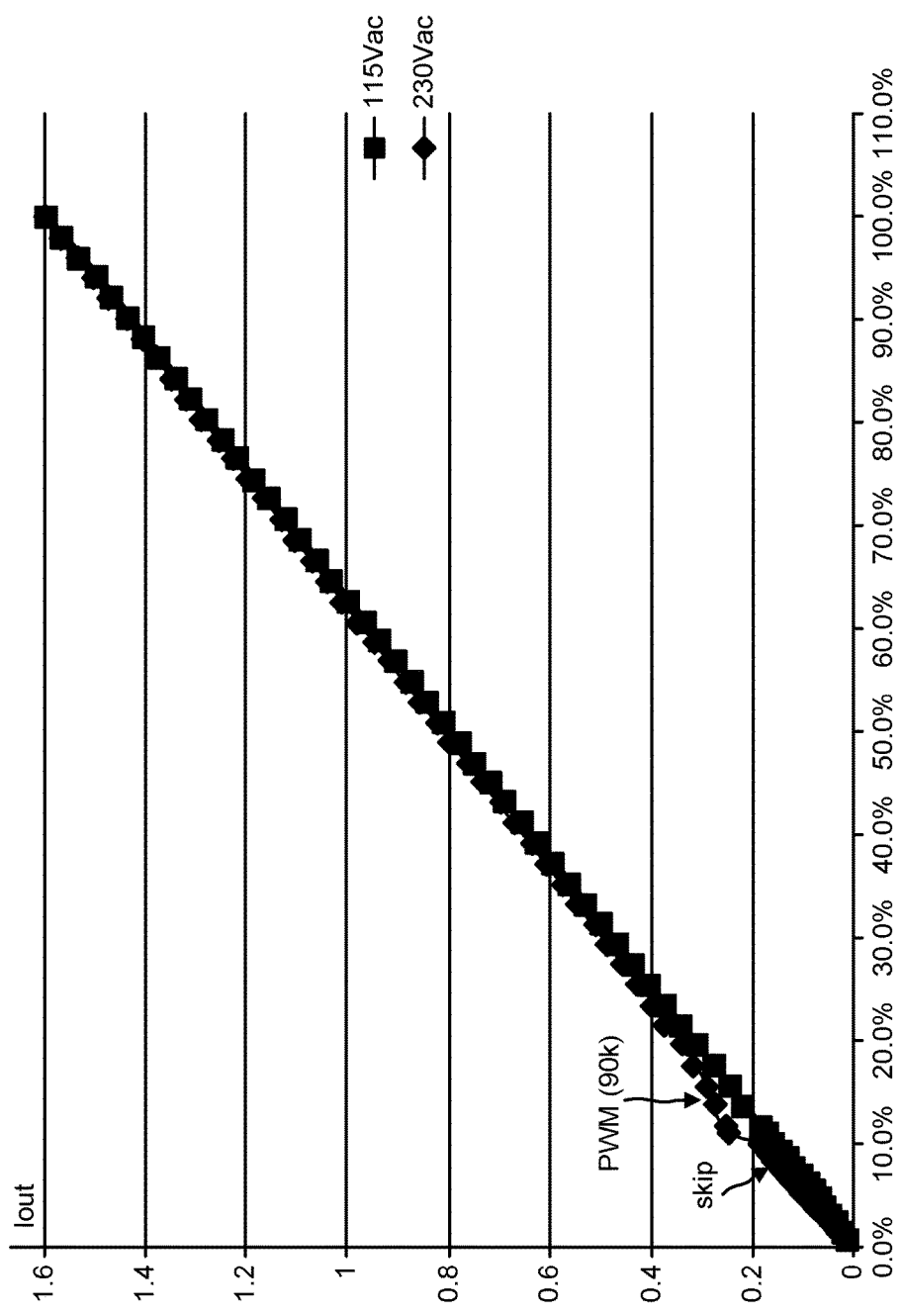

FIG. 7 is a graph showing an exemplary output current (Iout) curve over a wide dimming duty ratio for a conventional dimmable single-stage power converter operating across low and high line voltages utilizing a conventional fixed frequency control scheme.

Figure 8:
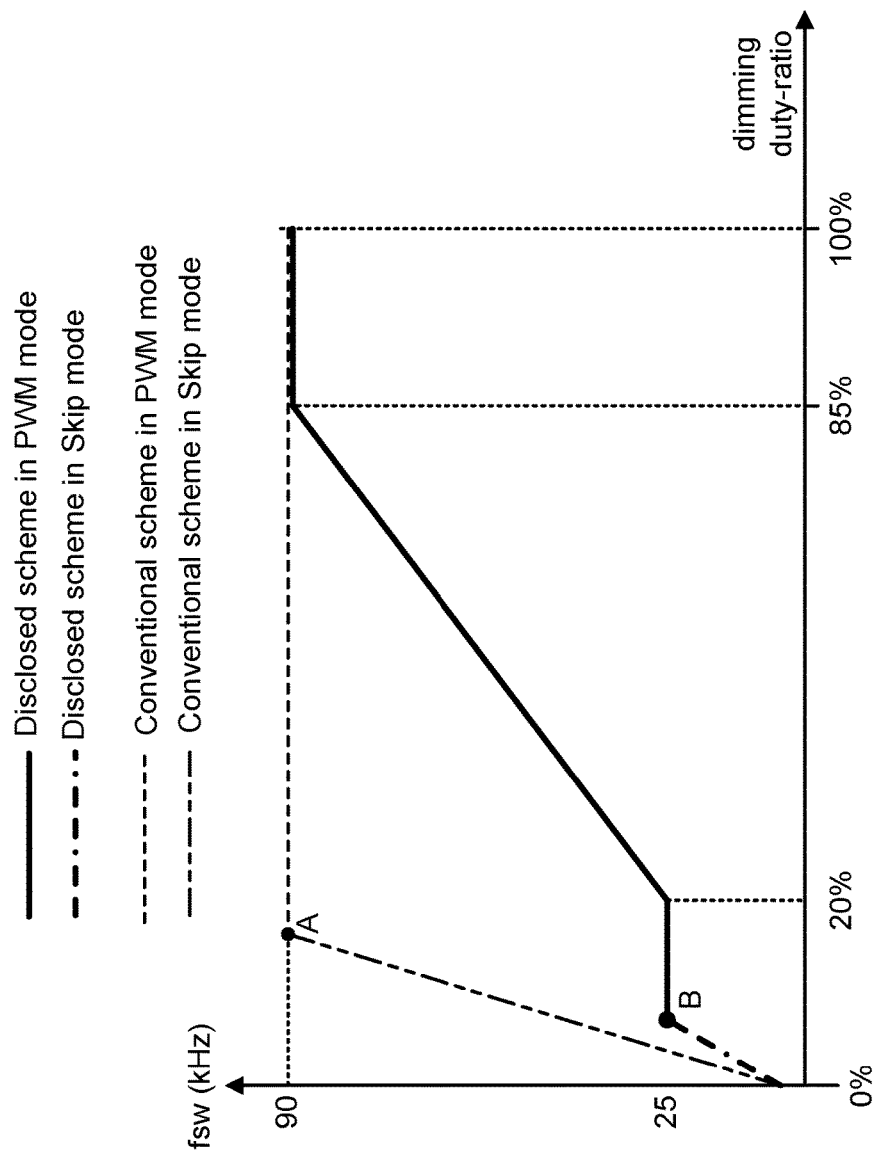

FIG. 8 is a graph showing the disclosed adaptive switching frequency control scheme compared to a conventional fixed frequency control scheme, in accordance with at least one embodiment of the present disclosure.

Figure 9:
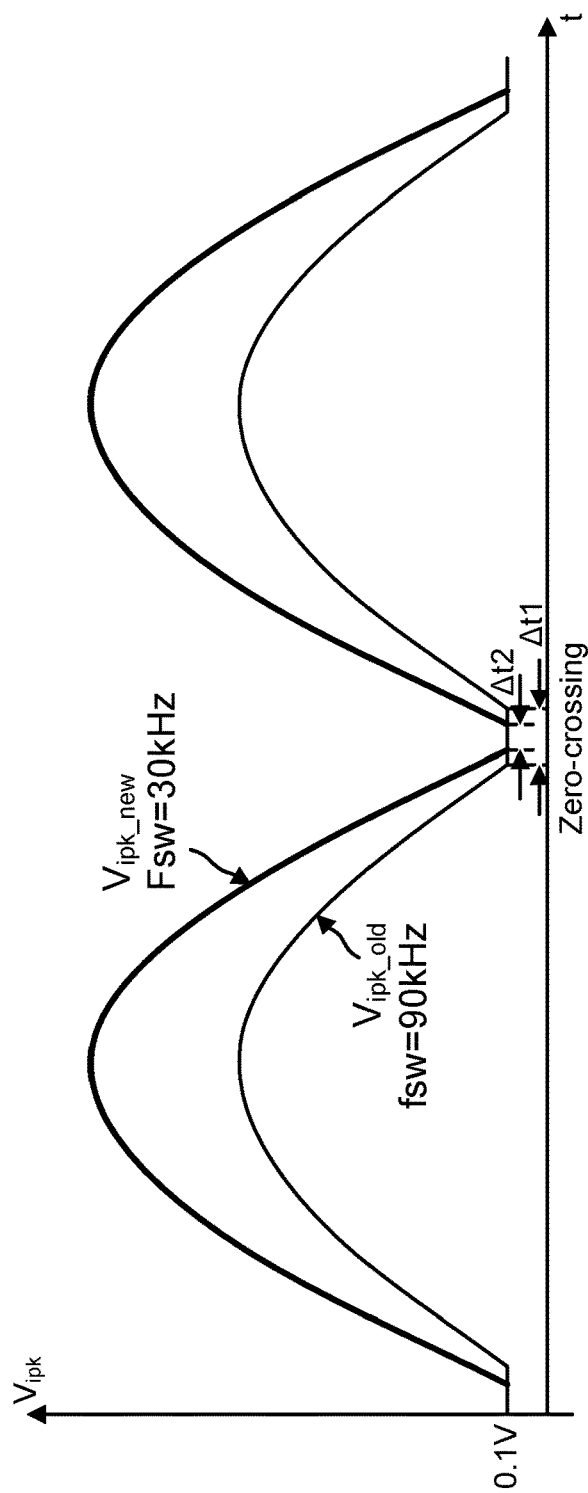

FIG. 9 is a graph showing a comparison of the clamp period for the current command ($V_{ipk}$) with a normal switching frequency (fsw) and the clamp period for the current command ($V_{ipk}$) with a reduced switching frequency (fsw), which is utilized by the disclosed adaptive switching frequency control scheme, in accordance with at least one embodiment of the present disclosure.

Figure 10:
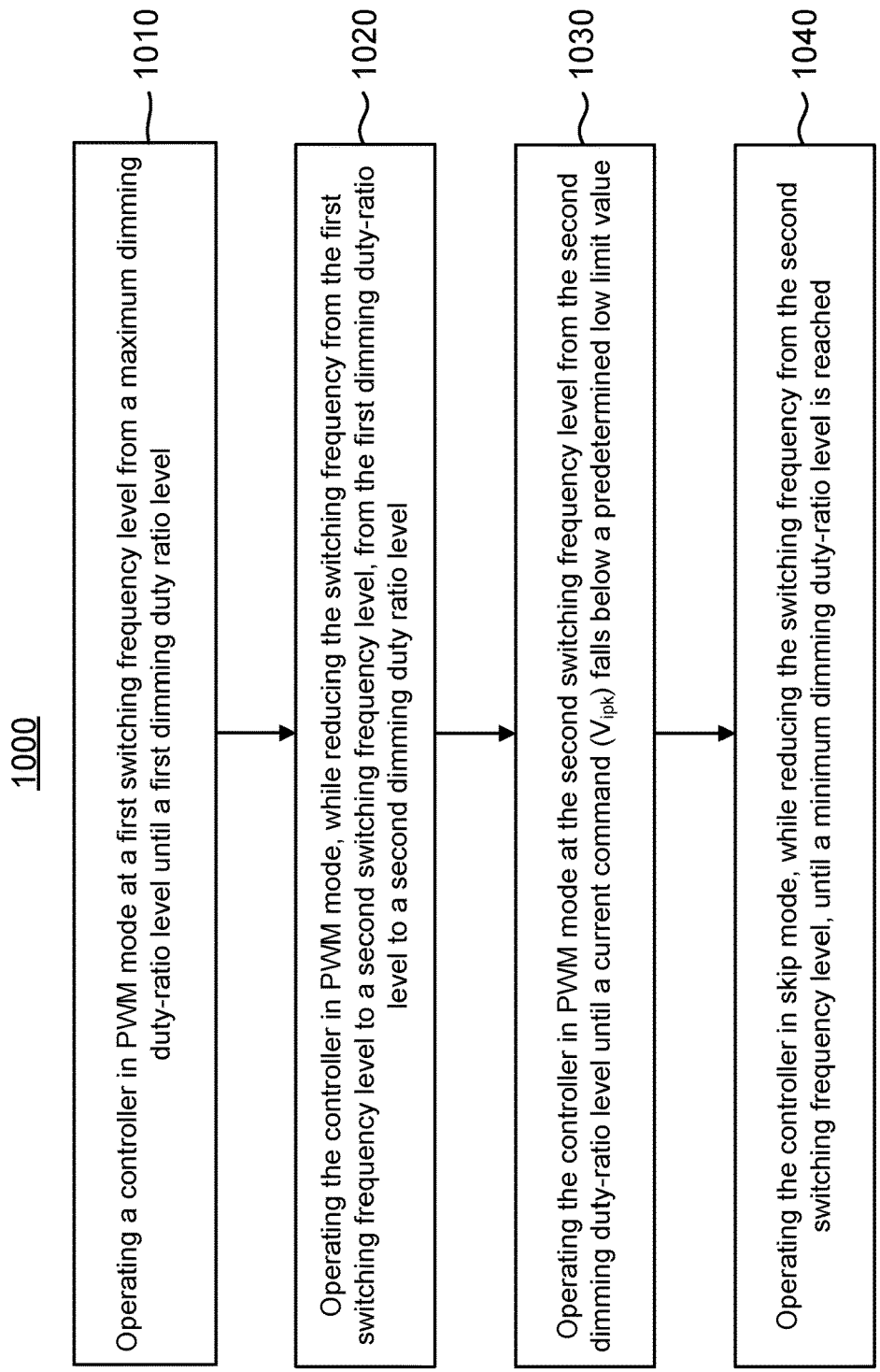

FIG. 10 is a flow chart showing the method for the disclosed adaptive switching frequency control scheme, in accordance with at least one embodiment of the present disclosure.

DESCRIPTION

The methods and apparatus disclosed herein provide an operative system for a dimmable single-stage power converter with adaptive switching frequency control. The system of the present disclosure employs a dimmable single-stage converter that utilizes an adaptive switching frequency control scheme. The use of the adaptive switching frequency control scheme allows for the dimmable single-stage converter to provide: (1) deep dimming down to one (1) percent (%) over a wide dimming range (e.g., 1 to 100%) across universal line voltages (e.g., 90 volts alternative current (Vac) to 277 Vac) with good dimming accuracy to maintain desirable linear or logarithmic dimming curves, (2) mitigation of audible noise at medium and low dimming, and (3) an improvement in total harmonic distortion (THD) (e.g., <20%) at low dimming levels (e.g., 50% dimming) while maintaining a good power factor (PF) (e.g., >0.9).

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the system described herein is merely one example embodiment of the present disclosure.

For the sake of brevity, conventional techniques and components related to dimmable single-stage power converters, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

I. Dimmable Single-Stage Power Converter and Operation

FIG. 1 a diagram showing an exemplary dimmable single-stage power converter 100 that may be employed for the disclosed dimmable single-stage power converter with adaptive switching frequency control that utilizes the disclosed adaptive switching frequency control scheme, in accordance with at least one embodiment of the present disclosure. It should be noted that the disclosed dimmable single-stage power converter with adaptive switching frequency control may be practiced with any suitable dimmable single-stage power converter including, but not limited to, buck-boost converters and boost converters. An example flyback converter is shown in FIG. 1 to be employed for the disclosed dimmable single-stage power converter with adaptive switching frequency control.

During operation of the dimmable single-stage power converter 100, a rectifier including a diode bridge 120, a choke 121 in parallel with a resistor 122, and electromagnetic interference (EMI) capacitors C1 and C2 rectifies an alternating line voltage (Vac) carried on an AC main 121 to provide a rectified input voltage (Vin,dc). The rectified input voltage (Vin,dc) still retains a pronounced sinusoidal profile across each half of an AC main cycle. The input line voltage (Vin,a) is inputted into an input voltage pin (Vin pin) of a controller 150. The rectified input voltage (Vin,dc) also switches on a start-up switch Q2, such as an depletion-mode NMOS transistor, such that the start-up switch Q2 allows for the input line voltage (Vin,a) to be inputted into a power pin ($V_{CC}$ pin) of the controller 150, thereby powering on the controller 150. In alternative embodiments, the start-up switch Q2 may be implemented using an enhancement-mode NMOS transistor or NPN bipolar junction transistor.

Once powered on, the controller 150 controls the switching of a power switch Q1, such as an NMOS transistor, by driving its gate through an output pin (OUTPUT pin). In alternative embodiments, the power switch Q1 may be implemented using a bipolar junction transistor. When switched on, the power switch Q1 allows a primary current to flow through a primary winding 110 of a transformer 115 responsive to the rectified input voltage (Vin,dc).

For each cycle of the power switch transistor Q1, the primary winding current ramps up from zero to a peak winding current value that depends upon the rectified input voltage (Vin,dc), the switch on time, and the inductance for primary winding 110. When the power switch transistor Q1 cycles off, a secondary winding current flows across a second winding 125 in the transformer 115, starting from a peak value and continuing to ramp down to zero. An output capacitor C3 stabilizes a resulting output voltage (Vout) produced by the second winding current. The output voltage (Vout) powers the light emitting diodes (LEDs). A diode D1 prevents the secondary winding current from flowing while the primary winding 110 conducts. Alternatively, diode D1 may be replaced by a transistor switch as is conventional for a flyback converter with synchronous rectification. The secondary winding current produces a reflected voltage across primary winding 110 and also across an auxiliary winding 130 for transformer 115. Diode D1 will have a voltage drop across it that prevents a direct relationship between the reflected voltage and the output voltage while the secondary current still flows. But when the secondary current just ramps to zero (i.e. the transformer reset time (Treset)), there is no voltage drop across diode D1 such that the resulting reflected voltage at that time is directly related to the output voltage (Vout).

By indirectly sampling the output voltage at this transformer reset time, controller 150 performs primary-only feedback control of the output voltage. For example, controller 150 may include a voltage sense pin ($V_{SENSE}$ pin) that samples the reflected voltage across auxiliary winding 130 through a voltage divider formed by a pair of resistors R3 and R4. The reflected voltage may also be rectified through a diode D2 and a capacitor C4 to form a power supply voltage ($V_{CC}$) received by controller 150 at the power pin ($V_{CC}$ pin). Controller 150 may include a ground pin (GROUND pin) and a current sense pin ($I_{SENSE}$ pin) that samples the primary winding current through the voltage produced across a current sense resistor Rcs and a sampling resistor Rs coupled to power switch Q1. Additionally, controller 150 may include a negative temperature coefficient/dimmer 2 pin (NTC/DIM2 pin) that samples the voltage at this pin through a variable resistor $R_{DIM}$ to determine the NTC-based output current derating function or the desired dimming for the LEDs (by product options). Controller 150 may also include a dimmer 1 pin (DIM 1) pin to receive pulse width modulation (PWM) pulses indicating the desired dimming for the LEDs.

Figure 2:
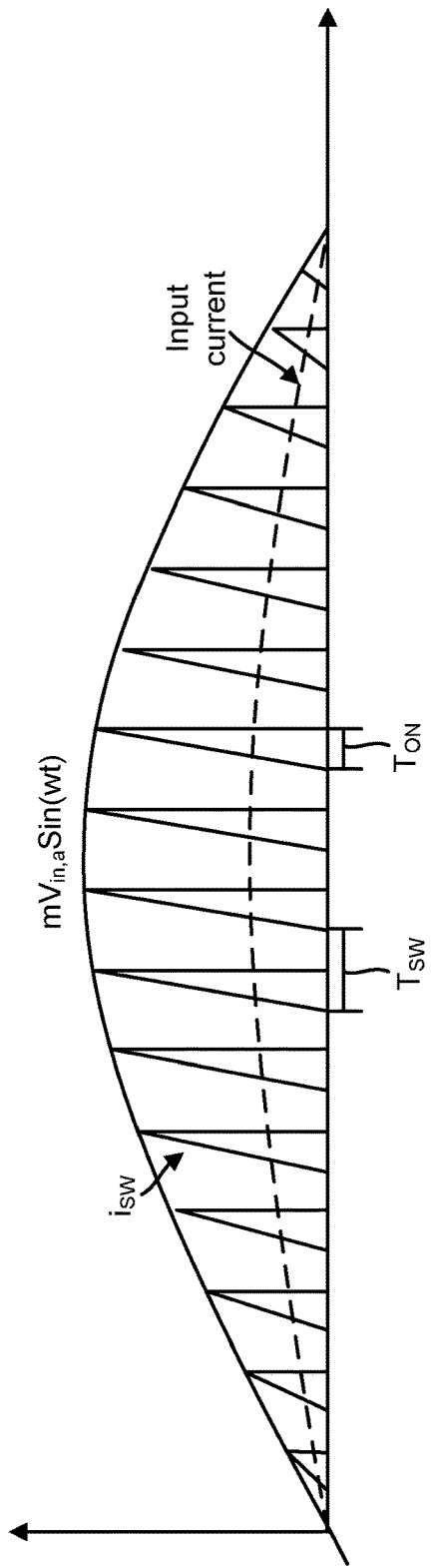
FIG. 2 is a graph showing the input current ($I_{in}$), the switch Q1 current ($I_{sw}$), and the peak current command (mVin,aSin(ωt)) over time for the dimmable single-stage power converter of FIG. 1, in accordance with at least one embodiment of the present disclosure.

FIG. 2 is a graph showing the input current ($I_{in}$), the switch Q1 current ($I_{sw}$), and the peak current command (mVin,aSin(ωt)) over time for the dimmable single-stage power converter of FIG. 1, in accordance with at least one embodiment of the present disclosure. In dimmable single-stage power converters, conventionally the EMI capacitors C1 and C2 (refer to FIG. 1) are small and, as such, the rectified input voltage (Vin,dc) has a waveform that is close to sinusoidal in shape. Note that the waveform of (Vin,dc) is ideally sinusoidal in shape without the effects of C1 and C2.

Accordingly, the peak current command is also close to sinusoidal in shape, and is expressed as mVin,aSin(ωt), where w is equal to $2*\pi*(2*f_{line})$, and $f_{line}$ is the line frequency of the AC input, and m is a constant determined by the controller 150 (refer to FIG. 1). The controller 150 senses the input line voltage (Vin,a) on an input voltage pin (Vin pin), and the controller 150 operates as a closed-loop control by comparing the sensed output current ($I_{cal}$) on a current sense pin ($I_{SENSE}$ pin) with a reference current (Iref), internal to the controller 150, to determine a multiplier m, which is used to multiply the input sense signal (Vin,aSin(ωt)) to generate the current command for peak current mode control (i.e. to generate the peak current command (mVin,aSin(ωt)). The value for m is uniquely determined, depending on system information (e.g., input line voltage (Vin,a), output power (Pout), transformer 115 inductance, current sense resistor (Rcs) resistance, etc.).

For peak current mode control, the switch Q1 current ($I_{sw}$) ramps up linearly for every switching cycle, and hits the peak current command (mVin,aSin(ωt)), as is shown in FIG. 2. The input EMI capacitors C1 and C2 filter out the high-frequency component of the switch Q1 current ($I_{sw}$) such that the low-frequency content remains as the input current ($I_{in}$), which is denoted by the dotted line shown in FIG. 2. A constant switching period of time for every switching cycle is denoted as Tsw on FIG. 2.

For a constant switching period (Tsw), the input current ($I_{in}$) can be readily derived by: $I_{in}$=0.5*m*Vin,aSin(ωt)/(Rcs*(Tsw/Ton)), where Rcs is the current sense resistor (refer to FIG. 1) resistance, and Ton is the time period that the power switch Q1 is switched on (i.e. when the switch Q1 current ($I_{sw}$) is shown as rising in FIG. 2).

As shown in FIG. 2, the input current ($I_{in}$) is shown to have the same phase as the rectified input voltage (Vin,dc), and to also be close to sinusoidal in shape similar to the rectified input voltage (Vin,dc). As such, the power factor for the system is very high (e.g., close to 1.0, which is ideal).

For dimming of the LEDs (refer to FIG. 1), the output current (Iout) changes as a function of the dimming input (e.g., the input to the DIM 1 pin on the controller 150 of FIG. 1). Currently, the market demands a wide dimming range from 100% to 1% with a 1% dimming resolution and a good dimming linearity (e.g., refer to FIG. 3). Alternatively, in some applications, a logarithmic dimming curve is preferred with the same dimming range and resolution (e.g., refer to FIG. 4).

For the LED load, when the output current (Iout) dims the LEDs from 100% to 1%, the LED voltage (i.e. the output voltage (Vout)) could drop by approximately 70%. Therefore, the output power (Pout) difference between 100% dimming and 1% dimming is approximately 140 times.

For flyback dimmable single-stage power converters (as is depicted in FIG. 1), the power equation is given by:

$$P_{out} = \frac{1}{4} L_m \left( \frac{V_{ipk}}{R_{cs}} \right)^2 * F_s * \eta \qquad \text{(Equation E-1)}$$

Or, written in another form:

$$P_{out} = \frac{(V_{in,dc} * T_{on})^2}{4 * L_m} * F_s * \eta \qquad \text{(Equation E-2)}$$

And, $V_{ipk}$ is related to $V_{in,dc}*T_{on}$ by:

$$V_{in,dc} * T_{on} = L_m \frac{V_{ipk}}{R_{cs}} \qquad \text{(Equation E-3)}$$

Where, $L_m$ is the inductance of the primary winding 110 of the transformer 115, $R_{cs}$ is resistance of the current sense resistor, $V_{ipk}$ is the current command (i.e. the switch Q1 current ($I_{sw}$)) in voltage form, $F_s$ is the switching frequency (i.e. the switching frequency of power switch Q1), η is the transformer 115 conversion efficiency, Vin,dc is the rectified input voltage, and Ton is the switching on-time (i.e. the time period that power switch Q1 is switched on (refer to FIG. 2)).

Figure 3:
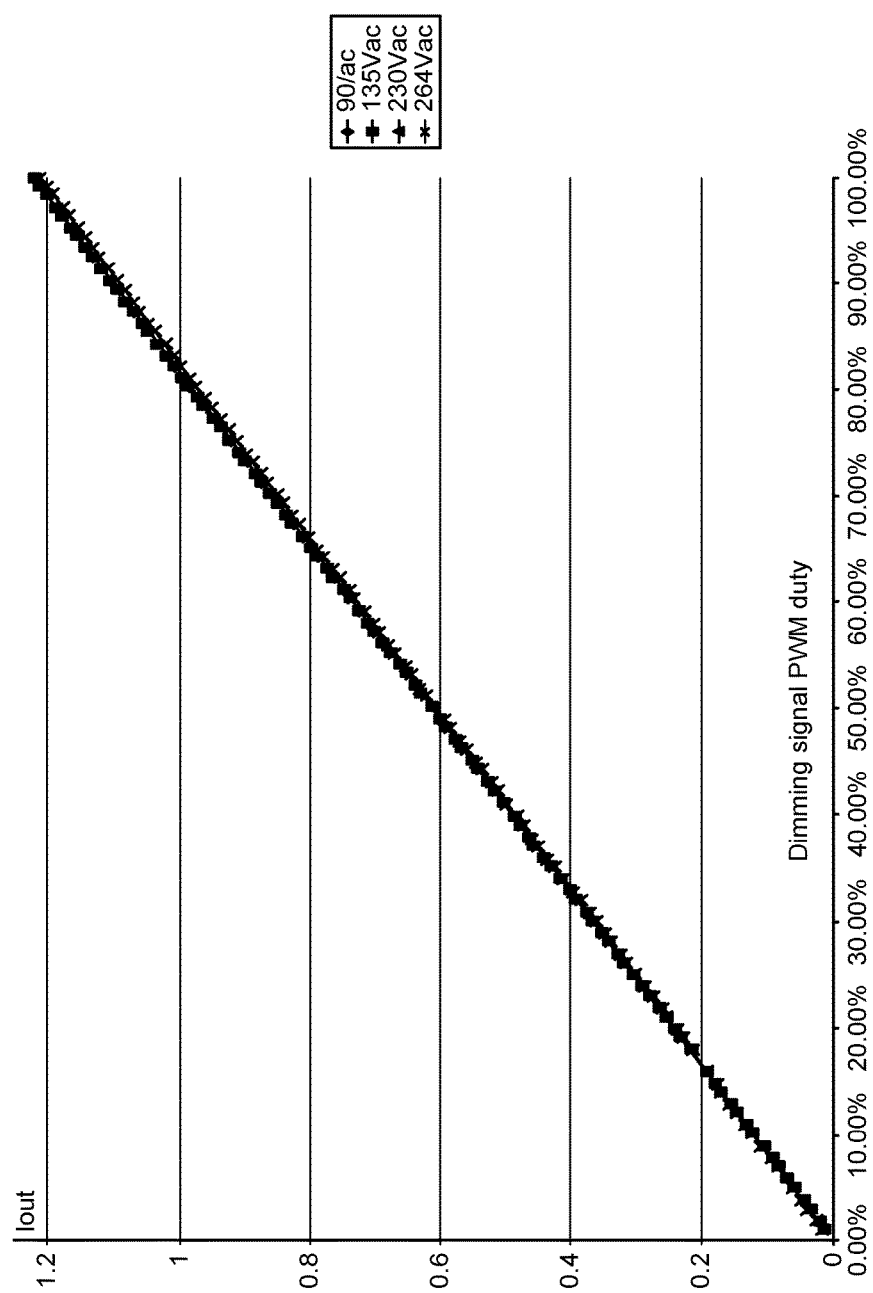
FIG. 3 is a graph showing exemplary desired linear dimming curves across universal line voltages, in accordance with at least one embodiment of the present disclosure.

FIG. 3 is a graph showing exemplary desired linear dimming curves across universal line voltages (e.g., 90 to 277 Vac), in accordance with at least one embodiment of the present disclosure. On this graph, the x-axis denotes the dimming signal pulse width modulation (PWM) duty cycle (i.e. from 0% to 100%) and the y-axis denotes the output current (Iout). In this graph, the dimming curves are shown to be linear in shape and overlap each other, which indicates good output current regulation over line voltages.

Figure 4:
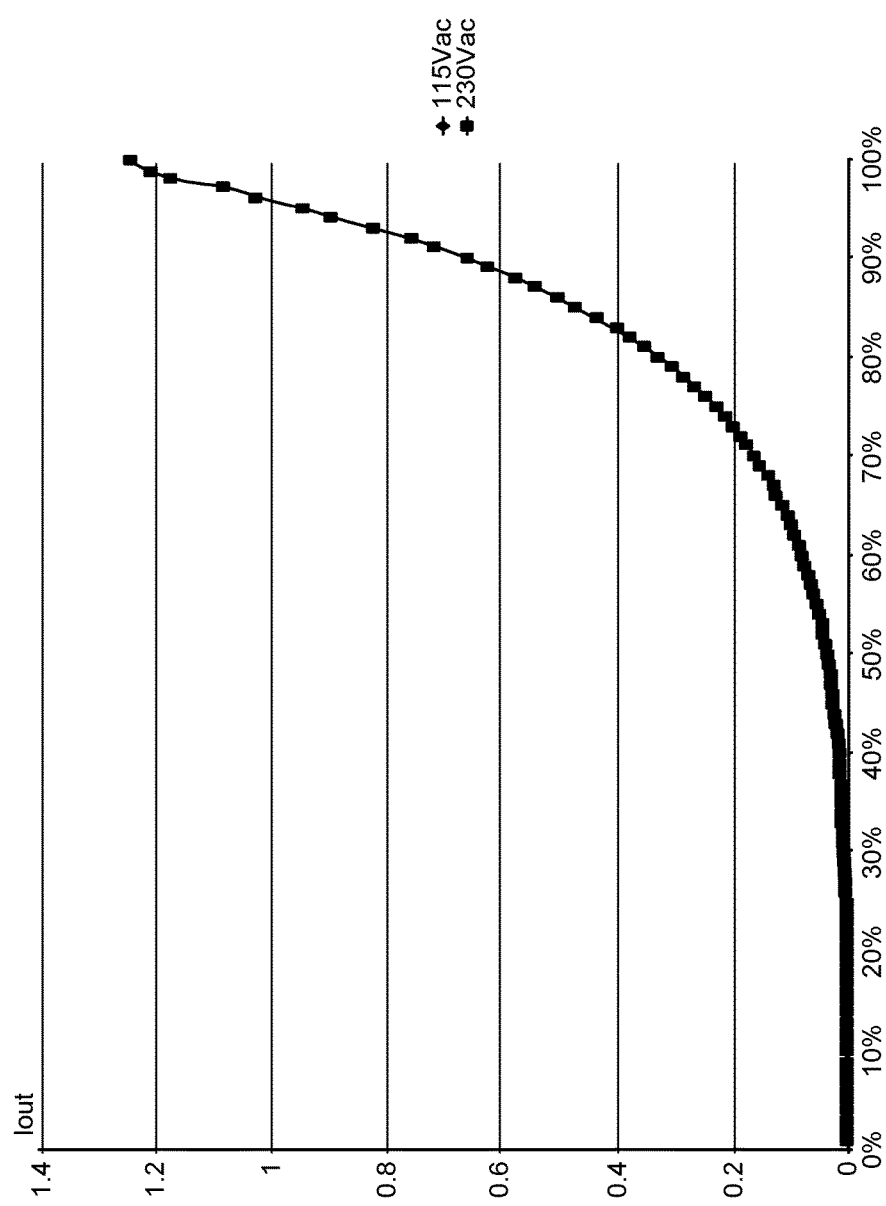
FIG. 4 is a graph showing exemplary desired logarithmic dimming curves across low and high line voltages, in accordance with at least one embodiment of the present disclosure.

FIG. 4 is a graph showing exemplary desired logarithmic dimming curves across low and high line voltages (e.g., 90 Vac and 277 Vac), in accordance with at least one embodiment of the present disclosure. On this graph, the x-axis denotes the dimming signal PWM duty cycle (i.e. from 0% to 100%) and the y-axis denotes the output current (Iout). In this graph, the dimming curves are shown to be logarithmic in shape and have good alignment, indicating good output current regulation over line voltages.

Referring to Equation E-1, when dimming down the output current (Iout), the current command ($V_{ipk}$) reduces to reflect the reduced output power (Pout), if the switching frequency remains unchanged. However, in real applications, the current command ($V_{ipk}$) cannot go below a certain limit. This is because from Equation E-3, a low value ($V_{ipk}$) results in a small switching on-time (Ton), which is worse for high-line voltages in a universal design (e.g., 90 to 277 Vac). It should be noted that the switching on-time (Ton) needs to be larger than the leading-edge spike (refer to FIG. 5) in the voltage waveform prevailing in a flyback single-stage power converter.

Figure 5:
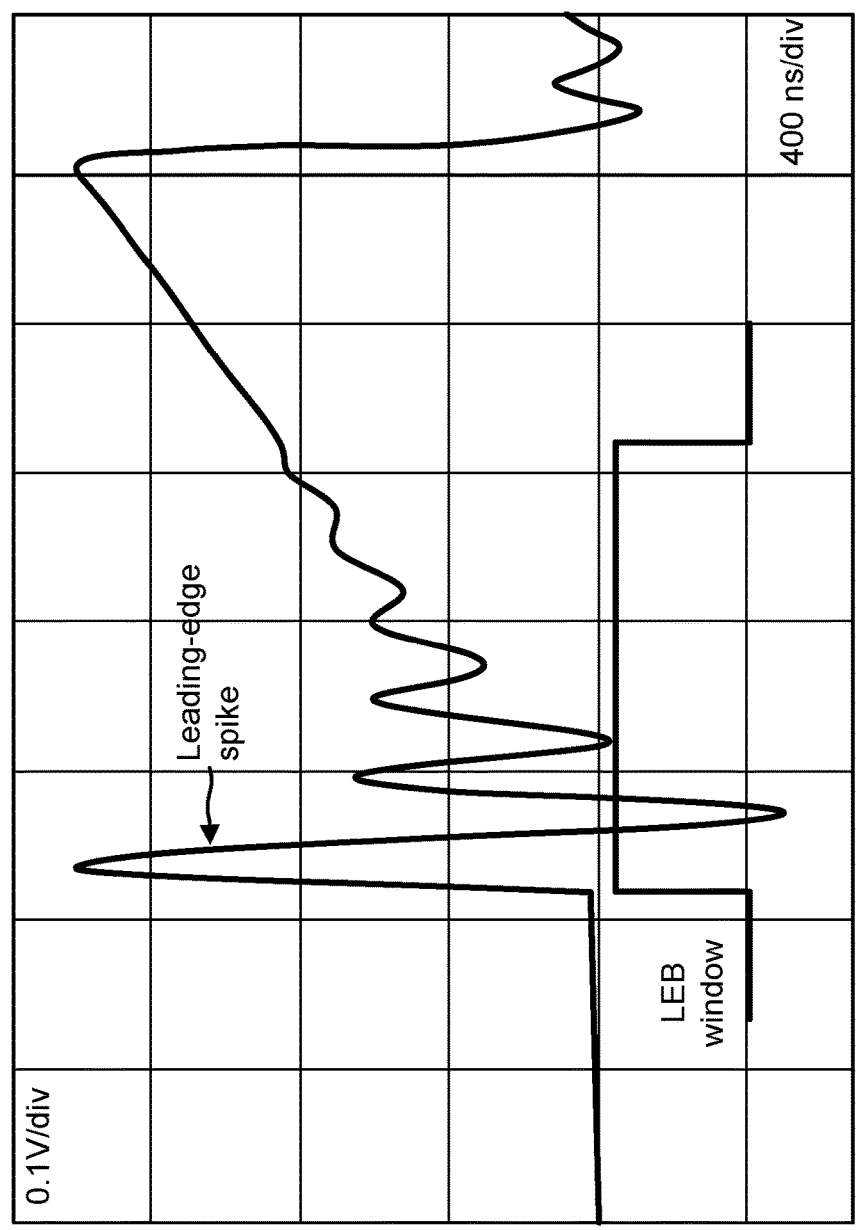
FIG. 5 is a graph showing an exemplary voltage waveform at the current sense pin of the controller in FIG. 1, in accordance with at least one embodiment of the present disclosure.

FIG. 5 is a graph showing an exemplary voltage waveform at the current sense pin (i.e. the $I_{SENSE}$ pin) of the controller 150 in FIG. 1, in accordance with at least one embodiment of the present disclosure. In this figure, the x-axis denotes time (e.g., 400 nanoseconds per division (ns/div)) and the y-axis denotes voltage (e.g., 0.1 volts per division (v/div)). In this figure, the voltage waveform is shown to exhibit a leading-edge spike at the beginning of when the power switch Q1 is turned on. This leading-edge spike needs to be filtered out in order to avoid prematurely turning off the power switch Q1. The controller 150 predetermines a leading-edge blank (LEB) window to be used to block the leading-edge spike of the voltage waveform. It should be noted that the LEB window needs to be wide enough to avoid premature turn-off of the power switch Q1.

FIG. 6 is a graph showing exemplary normal signals and runt signals for the $I_{SENSE}$ current (i.e. the current sensed on the current sense pin ($I_{SENSE}$ pin) of the controller 150 of FIG. 1), the $V_{SENSE}$ voltage (i.e. the voltage sensed on the voltage sense pin ($V_{SENSE}$ pin) of the controller 150 of FIG. 1), and the secondary diode current ($I_{SEC}$) (i.e. the current through diode D1 of FIG. 1), in accordance with at least one embodiment of the present disclosure. On this graph, the x-axis denotes time and the y-axis denotes the $I_{SENSE}$ current, the $V_{SENSE}$ voltage, and the $I_{SEC}$ current. Also, on this graph, the signals on the left side (a) of the graph are exemplary normal signals for the $I_{SENSE}$ current, the $V_{SENSE}$ voltage, and the $I_{SEC}$ current; and the signals on the right side (b) of the graph are exemplary runt signals for the $I_{SENSE}$ current, the $V_{SENSE}$ voltage, and the $I_{SEC}$ current.

For all primary-side controllers 150 (i.e. controllers 150 located on the primary side of the transformer 115, as is shown in FIG. 1), the output information needs to be sensed by the controller 150 in order for the controller 150 to be able to calculate the output current (Iout). The output information (i.e. the $V_{SENSE}$ voltage) is reflected at the voltage sense pin ($V_{SENSE}$ pin) of the controller 150 when the energy stored in the primary winding 110 of the transformer 115 is able to reverse the current in the secondary winding 125 of the transformer 115 and force the diode D1 to conduct.

However, if the primary winding 110 of the transformer 115 does not store sufficient energy to reverse the current in the secondary winding 125 of the transformer 115, the $V_{SENSE}$ voltage is merely a runt $V_{SENSE}$ voltage signal (refer to FIG. 6). When compared to a normal $V_{SENSE}$ voltage signal (refer to FIG. 6), it is difficult for the controller 150 to determine the output current (Iout) from the runt $V_{SENSE}$ voltage signal. This is because within the controller 150, the output current (Iout) is derived from the secondary diode current ($I_{SEC}$) after averaging it over each switching cycle, thereby making $T_{RESET}$ (i.e. the transformer reset time) (refer to FIG. 6) a critical parameter.

For a normal $V_{SENSE}$ voltage signal, the controller 150 can use $V_{SENSE}$ voltage signal to locate the knee point A (refer to FIG. 6), and derive $T_{RESET}$ by using the switch-off time at the knee point A. However for a runt $V_{SENSE}$ voltage signal, the controller 150 cannot locate the knee point A due to the round-off shape of the runt $V_{SENSE}$ voltage signal and, as such, the controller 150 cannot calculate the output current (Iout).

Therefore, from a $V_{SENSE}$ voltage signal fidelity point of view, the energy stored in the primary winding 110 of the transformer 115, which can be expressed as $$\frac{1}{2}L_m\left(\frac{V_{ipk}}{R_{cs}}\right)^2,$$

has a low limit (i.e. for a given dimmable single-stage converter design, the current command ($V_{ipk}$) cannot be pushed too low or else the controller 150 will not be able to calculate the output current (Iout)). In one or more embodiments, the low limit for the current command ($V_{ipk}$) is set from 0.2 to 0.3 volts (V) to ensure that the controller 150 is able to calculate the output current (Iout).

In addition, the current command ($V_{ipk}$) has a high limit out of consideration for efficiency because a high current command ($V_{ipk}$) will lead to an unnecessary loss. A such, in one or more embodiments, the high limit for the current command ($V_{ipk}$) is set from 1.0 to 1.5 V.

Referring to Equation E-1, if the controller 150 reduces the current command ($V_{ipk}$) and keeps the switching frequency unchanged when dimming down, then from 1.25 V down to 0.25 V for the current command ($V_{ipk}$), the output power (Pout) is reduced to $(0.25/1.25)^2$, which is equal to 4%. As such, the output power (Pout) is not high enough to dim down to 1% (which is desired), where the output power (Pout) needs to be reduced to (1/140), which is equal to 0.71%. Thus, it follows that the switching frequency will need to be reduced by a certain amount in order to achieve the desired deep dimming down to 1%.

II. Conventional Fixed Frequency Control Schemes

Currently, for some conventional dimmable single-stage power converters, in order to achieve the desired deep dimming down to 1%, a conventional fixed frequency control scheme is utilized by the controller 150. For these schemes, the controller 150 will operate in pulse width modulation (PWM) mode for heavy loads. The controller 150 will continue to operate in PWM mode until the load drops enough and the current command ($V_{ipk}$) is below a certain low limit value (e.g., 0.25 V) for a whole line cycle.

For some conventional fixed frequency control schemes, after the controller 150 detects that the current command ($V_{ipk}$) is below a certain low limit (e.g., 0.25V) for a whole line cycle, the controller 150 will begin to run in pulse frequency mode (PFM) mode. In PFM mode, the current command ($V_{ipk}$) is fixed at a certain value (e.g., 0.25 V) for every switching cycle (i.e. no more constant on-time operation occurs), and the frequency is controlled.

For other conventional fixed frequency control schemes, after the controller 150 detects that the current command ($V_{ipk}$) is below a certain low limit (e.g., 0.25V) for a whole line cycle, the controller 150 will begin to run in skip mode. For skip mode, the output current is calculated cycle-by-cycle; when the calculated output current (Iout) is larger than the targeted value, the controller 150 starts to skip switching cycles until the difference between the two values is small enough according to a predetermined value.

Regardless of whether the controller 150 transitions to PFM mode or to skip mode to effectively reduce the switching frequency, the system essentially loses its power factor (PF) correction in the modes, thereby resulting in an undesirable PF and THD. It should be noted that some conventional electrical standards require that individual harmonics pass the requirements at any level of dimming. Operating the controller 150 in PFM mode or skip mode at not a low enough dimming level will cause the THD to not meet the requirements. However, tests have found that dimmable single-stage power converters operating in PFM mode or skip mode at low dimming levels (e.g., 10%) pass the individual harmonics requirements.

In addition, tests have found that it is not always possible to dim dimmable single-stage power converters operating in PWM mode at a high switching frequency down to 15% dimming. The major challenge here is that when operating with a high line voltage, the output current (Iout) is limited by a minimum on-time (i.e. for the LEB window purposes), and the system may not be able to dim down effectively.

Referring to Equation E-2, the minimum output power (Pout), while operating in PWM mode, is related to the rectified input voltage (Vin,dc), the switching frequency ($F_s$), and the minimum switch on-time (Ton). If the minimum output power (Pout) is not low enough, then the output current (Iout) cannot dim down effectively before approaching the PFM mode or the skip mode, as is shown in FIG. 7.

FIG. 7 is a graph showing an exemplary output current (Iout) curve over a wide dimming duty ratio for a conventional dimmable single-stage power converter operating across low and high line voltages (e.g., 115 Vac and 230 Vac) utilizing a conventional fixed frequency control scheme. On this graph, the x-axis denotes the dimming duty ratio (i.e. from 0% to 100%) and the y-axis denotes the output current (Iout). In this graph, the output current (Iout) curve for the high line voltage (i.e. 230 Vac) is shown to bend up prior to approaching the skip mode (or PFM mode). As such, the output current (Iout) is shown to not effectively dim down before approaching the skip mode (or PFM mode) from the PWM mode.

III. Disclosed Adaptive Switching Frequency Control Scheme

In order to solve the issue of the output current (Iout) not being able to effectively dim down before approaching skip mode (or PFM mode) while operating with high line voltages, the disclosed system adaptively sets the PWM switching frequency as a function of the dimming input.

FIG. 8 is a graph showing the disclosed adaptive switching frequency control scheme compared to a conventional fixed frequency control scheme (which was previously discussed above), in accordance with at least one embodiment of the present disclosure. On this graph, the x-axis denotes the dimming duty ratio (i.e. from 0% to 100%) and the y-axis denotes the switching frequency (fsw) (also referred to as $F_s$) in kilohertz (kHz).

For the disclosed adaptively switching frequency control scheme, the switching frequency (fsw) is adaptively set to different values at different dimming levels. For example, as is shown in FIG. 8, from 85% dimming to 20% dimming, the switching frequency (fsw) is set to linearly decrease from 90 kHz to 25 kHz. It should be noted that in other embodiments, the switching frequency (fsw) may be set to decrease in a non-linear fashion (e.g., in a parabolic fashion). In addition, it should be noted that 25 kHz is selected to be above the audible noise band in order to mitigate audible noise from the system.

Once the switching frequencies are set, the closed-loop control in the controller 150 determines the multiplier m, and generates a proper current command ($V_{ipk}$) to deliver the correct amount of output current (Iout).

From Equation E-1, the current command ($V_{ipk}$) level increases with a reduced switching frequency ($F_s$). For example, at 20% dimming, the current command ($V_{ipk}$) running at 25 kHz will be around 1.9 times of the current command ($V_{ipk}$) running at 90 kHz:

$$\frac{V_{ipk\_25k}}{V_{ipk\_90k}} = \sqrt{\frac{90k}{25k}} = 1.897$$

From Equation E-3, the switch on-time at 25 kHz is also around 1.9 times of that at 90 kHz:

$$\frac{T_{on\_25k}}{T_{on\_90k}} = \sqrt{\frac{90k}{25k}} = 1.897$$

With an enlarged switch on-time, the dimming curve with the disclosed adaptive switching frequency control scheme will not bend-up when approaching the skip mode. FIG. 3 shows exemplary linear dimming curves (without the "bend-up" issue), which will be exhibited when utilizing the disclosed adaptive switching frequency control scheme.

Besides providing better dimming accuracy at certain points, the disclosed adaptive switching frequency control scheme also has three main other advantages, which are: (1) an improved THD, (2) a mitigation of audible noise, and (3) an improved efficiency when operating with a high line voltage.

Regarding the first main advantage of an improved THD, with the reduced switching frequency (fsw) setting, for the same output power (Pout), the current command ($V_{ipk}$) elevates (i.e. increases), as is given by the equation E-1. The elevated current command ($V_{ipk}$) helps improve the signal-to-noise (S/N) ratio. Often, as the current command ($V_{ipk}$) approaches zero, it is required to be clamped to a certain level (e.g., 0.1V). This clamp period is not favorable to THD. As such, a shorter clamping period improves THD.

FIG. 9 is a graph showing a comparison of the clamp period for the current command ($V_{ipk}$) with a normal switching frequency (fsw) (e.g., 90 KHz) and the clamp period for the current command ($V_{ipk}$) with a reduced switching frequency (fsw) (e.g., 30 KHz), which is utilized by the disclosed adaptive switching frequency control scheme, in accordance with at least one embodiment of the present disclosure. On this graph, the x-axis denotes the time and the y-axis denotes the current command ($V_{ipk}$). In this graph, with a reduced switching frequency (fsw) of 30 KHz, the clamping period is shown to be reduced than from utilizing the normal switching frequency (fsw) of 90 KHz. This reduction in clamping period provides an improvement in THD.

Regarding the second main advantage of a mitigation of audible noise, from FIG. 8, it can be seen that with the employment of the disclosed adaptive switching frequency control scheme, the PWM and skip mode transition occurs at Node B, which is at a much lower dimming level than Node A, which is where the transition occurs with the employment of the conventional fixed frequency control scheme. For PWM mode, the minimum switching frequency (fsw) is 25 kHz, which is above the audible band; and in skip mode, since the output power (Pout) is reduced to a minimal level, the noise level is also minimal.

Regarding the third main advantage of an improved efficiency when operating with a high line voltage, reducing the switching frequency (fsw) dramatically reduces the switching losses, which are dominate when operating with a high line voltage. With the use of the reduced switching frequency (fsw), the overall efficiency of the system when operating with a high line voltage improves significantly (e.g., around 3%).

FIG. 10 is a flow chart showing the method 1000 for the disclosed adaptive switching frequency control scheme (refer also to FIG. 8), in accordance with at least one embodiment of the present disclosure. At the start of the disclosed method 1000, a controller 150 of a dimmable single-stage power converter (refer to FIG. 1) operates in pulse width modulation (PWM) mode at a first switching frequency level (e.g., 90 kilohertz (kHz)) from a maximum dimming duty-ratio level (e.g., 100 percent (%)) until a first dimming duty-ratio level (e.g., 85%) 1010. In one or more embodiments, when the controller is operating at the maximum dimming duty-ratio level (e.g., 100%), the current command ($V_{ipk}$) is at a designed high limit value (e.g., 1.25 volts (V)). The designed high limit value (e.g., 1.25V) for the current command ($V_{ipk}$) is related to efficiency to avoid unnecessary loss.

Then, the controller operates in PWM mode, while reducing switching frequency from the first switching frequency level (e.g., 90 kHz) to a second switching frequency level (e.g., 25 kHz), from the first dimming duty-ratio level (e.g., 85%) until a second dimming duty-ratio level (e.g., 20%) 1020. In at least one embodiment, the second switching frequency level (e.g., 25 kHz) is above an audible noise band to mitigate audible noise.

The controller then operates in PWM mode at the second switching frequency level (e.g., 25 kHz) from the second dimming duty-ratio level (e.g., 20%) until a current command ($V_{ipk}$) falls below a predetermined low limit value (e.g., 0.25 V) 1030. In one or more embodiments, the predetermined low limit value (e.g., 0.25V) for the current command ($V_{ipk}$) is related to an amount of energy stored in the primary winding 110 of the transformer 115 of the single-stage power converter (refer to FIG. 1).

Then, the controller operates in skip mode, while reducing the switching frequency from the second switching frequency level (e.g., 25 kHz), until a minimum dimming duty-ratio level (e.g., 1%) is reached 1040. It should be noted that the controller could still operate in PWM mode below the second dimming duty-ratio level (e.g., 20%) to avoid an increase in total harmonic distortion (THD) and more importantly in individual harmonics. Then, the method 1000 ends.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for a circuit with adaptive switching frequency control, the method comprising:
   operating a controller of a dimmable single-stage power converter in pulse width modulation (PWM) mode at a first switching frequency level from a maximum dimming duty-ratio level until a first dimming duty-ratio level;
   operating the controller in PWM mode, while reducing switching frequency from the first switching frequency level to a second switching frequency level, from the first dimming duty-ratio level until a second dimming duty-ratio level;
   operating the controller in PWM mode at the second switching frequency level from the second dimming duty-ratio level until a current command (Vipk) falls below a predetermined low limit value; and
   operating the controller in skip mode, while reducing the switching frequency from the second switching frequency level, until a minimum dimming duty-ratio level is reached.

2. The method of claim 1, wherein the switching frequency is reduced from the first switching frequency level to the second switching frequency level in one of a linear fashion or a non-linear fashion.

3. The method of claim 1, wherein the switching frequency is reduced from the first switching frequency level to the second switching frequency level in a parabolic fashion.

4. The method of claim 1, wherein the second switching frequency level is above an audible noise band to mitigate audible noise.

5. The method of claim 1, wherein when the controller is operating at the maximum dimming duty-ratio level, the current command (Vipk) is at a designed high limit value.

6. The method of claim 5, wherein the designed high limit value for the current command (Vipk) is related to efficiency to avoid unnecessary loss.

7. The method of claim 1, wherein the predetermined low limit value for the current command (Vipk) is related to an amount of energy stored in a primary winding of a transformer of the single-stage power converter.

8. The method of claim 1, wherein the controller still operates in PWM mode below the second dimming duty-ratio level to avoid an increase in total harmonic distortion (THD) or individual harmonics.

9. The method of claim 1, wherein the controller operates in skip mode at low dimming duty-ratio levels.

10. The method of claim 1, wherein the switching frequency is a frequency a power switch Q1 of the single-stage power converter is switched at.

11. The method of claim 1, wherein the method further comprises:
    receiving, by the controller, pulses indicating a desired level of dimming; and
    adjusting, by the controller, an output current level for the single-stage power converter according to the pulses.

12. A circuit with adaptive switching frequency control, the circuit comprising:
    a single-stage power converter; and
    a controller within the single-stage power converter to operate in pulse width modulation mode (PWM) at a first switching frequency level from a maximum dimming duty-ratio level until a first dimming duty-ratio level; to operate in PWM mode while reducing switching frequency from the first switching frequency level to a second switching frequency level, from the first dimming duty-ratio level until a second dimming duty-ratio level; to operate in PWM mode at the second switching frequency level from the second dimming duty-ratio level until a current command (Vipk) falls below a predetermined low limit value; and to operate in skip mode, while reducing the switching frequency from the second switching frequency level, until a minimum dimming duty-ratio level is reached.

13. The circuit of claim 12, wherein the switching frequency is reduced from the first switching frequency level to the second switching frequency level in one of a linear fashion or a non-linear fashion.

14. The circuit of claim 12, wherein the switching frequency is reduced from the first switching frequency level to the second switching frequency level in a parabolic fashion.

15. The circuit of claim 12, wherein the second switching frequency level is above an audible noise band to mitigate audible noise.

16. The circuit of claim 12, wherein when the controller is operating at the maximum dimming duty-ratio level, the current command (Vipk) is at a designed high limit value.

17. The circuit of claim 16, wherein the designed high limit value for the current command (Vipk) is related to efficiency to avoid unnecessary loss.

18. The circuit of claim 12, wherein the predetermined low limit value for the current command (Vipk) is related to an amount of energy stored in a primary winding of a transformer of the single-stage power converter.

19. The circuit of claim 12, wherein the controller operates in PWM mode below the second dimming duty-ratio level to avoid an increase in total harmonic distortion (THD).

20. The circuit of claim 12, wherein the switching frequency is a frequency that a power switch Q1 of the single-stage power converter is switched at.

21. The circuit of claim 12, wherein the controller is further to receive pulses indicating a desired level of dimming, and to adjust an output current level for the single-stage power converter according to the pulses.

* * * * *